United States Patent [19]

Katoot

[11] Patent Number: 5,883,164
[45] Date of Patent: Mar. 16, 1999

[54] POLYMER ADDITIVES FOR FORMING OBJECTS

[76] Inventor: Mohammad W. Katoot, 1080 Laurian Park Dr., Roswell, Ga. 30075

[21] Appl. No.: 675,183

[22] Filed: Jul. 3, 1996

Related U.S. Application Data

[60] Provisional application No. 60/003,717 Sep. 13, 1995.
[51] Int. Cl.⁶ ..................................................... C08K 5/34
[52] U.S. Cl. ........................... 524/104; 524/190; 524/236; 524/354; 524/386; 524/434; 524/435
[58] Field of Search ..................................... 524/104, 190, 524/236, 354, 386, 434, 435

[56] References Cited

U.S. PATENT DOCUMENTS

| | | | |
|---|---|---|---|
| 3,932,557 | 1/1976 | Matthews | 260/837 R |
| 3,985,693 | 10/1976 | Lonning | 260/23 X |
| 4,049,750 | 9/1977 | Brenner | 260/864 |
| 4,267,279 | 5/1981 | Howell | 525/17 |
| 4,267,319 | 5/1981 | Degen | 542/434 |
| 4,287,083 | 9/1981 | McDowell et al. | 252/182 |
| 4,325,841 | 4/1982 | Howell | 252/431 |
| 4,469,611 | 9/1984 | Snyder, Jr. et al. | 252/75 |
| 4,524,104 | 6/1985 | Hagio et al. | 428/341 |
| 4,558,075 | 12/1985 | Suss et al. | 523/216 |
| 4,620,994 | 11/1986 | Suss et al. | 427/407.1 |
| 4,699,934 | 10/1987 | Ohkado et al. | 523/106 |
| 4,822,849 | 4/1989 | Vanderlaan | 525/17 |
| 4,866,148 | 9/1989 | Geyer et al. | 526/264 |
| 4,888,413 | 12/1989 | Domb | 528/272 |
| 5,037,858 | 8/1991 | MacDonald | 521/38 |
| 5,166,291 | 11/1992 | Atkins et al. | 523/508 |
| 5,235,008 | 8/1993 | Hefner, Jr. et al. | 525/529 |
| 5,250,645 | 10/1993 | Maurer | 526/320 |
| 5,281,634 | 1/1994 | Hesse et al. | 523/514 |
| 5,294,670 | 3/1994 | Hata et al. | 525/154 |
| 5,306,739 | 4/1994 | Lucey | 522/42 |
| 5,312,863 | 5/1994 | Van Rheenen et al. | 524/555 |
| 5,324,788 | 6/1994 | Kuo | 525/329.5 |
| 5,358,997 | 10/1994 | Rosthauser et al. | 524/591 |
| 5,362,800 | 11/1994 | Caramaschi et al. | 525/48 |
| 5,369,178 | 11/1994 | Miyazaki et al. | 525/155 |
| 5,514,679 | 5/1996 | Aldous et al. | 514/247 |

*Primary Examiner*—Edward J. Cain
*Attorney, Agent, or Firm*—Jones & Askew, LLP

[57] ABSTRACT

The present invention relates to novel methods and compositions related to polymer concrete comprising conventional resins with novel additives to prevent shrinking and cracking of the resin, to accelerate curing and to treat fillers. These compositions and methods can be employed to form large objects and objects of irregular shapes.

20 Claims, No Drawings

POLYMER ADDITIVES FOR FORMING OBJECTS

PRIOR RELATED APPLICATIONS

This application claims priority to a provisional patent application Ser. No. 60/003,717 filed on Sep. 13, 1995.

1. Technical Field

The present invention relates to a polymer concrete comprising conventional resins with certain additives to prevent shrinking and cracking of the resin. More particularly, the present invention relates to polymer concrete that is particularly useful in rapidly casting large objects including poured marble.

2. Background of the Invention

A plastic is an organic polymer, available as a resin. These resins can be liquid or paste and can be used for embedding, coating, and adhesive bonding; or they can be molded, laminated, or formed into desired shapes, including sheet, film, or larger mass bulk shapes.

The number of basic plastic materials is large and the list is increasing. In addition, the number of variations and modifications to these basic plastic materials is also quite large. Taken together, the resultant quantity of materials available is too large to be completely understood and correctly applied by anyone other than those whose day-to-day work puts them in direct contact with a diverse selection of materials. The practice of mixing brand names, trade names, and chemical names of various plastics only makes the problem of understanding these materials more troublesome. Another variable that makes it difficult for those not versed in plastics to understand and properly design with plastics is the large number of processes by which plastics can be fabricated. Fortunately, there is an organized pattern on which an orderly presentation of these variables can be based. While there are numerous minor classifications for polymers, depending on how one wishes to categorize them, nearly all can be placed into one of two major classifications—thermosetting materials (or thermosets) and thermoplastic materials. Likewise, foams, adhesives, embedding resins, elastomers, and so on, can be subdivided into the thermoplastic and thermosetting classifications. Thermosetting plastics are cured, set, or hardened into a permanent shape.

Curing is an irreversible chemical reaction known as cross-linking, which usually occurs under heat. For some thermosetting materials, curing is initiated or completed at room temperature. Even here, however, it is often the heat of the reaction, or the exotherm, which actually cures the plastic material. Such is the case, for instance, with a room-temperature-curing epoxy or polyester compound. The cross-linking that occurs in the curing reaction is brought about by the linking of atoms between or across two linear polymers, resulting in a three-dimensional rigid chemical structure. Although the cured part can be softened by heat, it cannot be remelted or restored to the flowable state that existed before curing. Continued heating for long times leads to degradation or decomposition.

Thermoplastics differ from thermosets in that they do not cure or set under heat as do thermosets. Thermoplastics merely soften, or melt when heated, to a flowable state, and under pressure they can be forced or transferred from a heated cavity into a cool mold. Upon cooling in a mold, thermoplastics harden and take the shape of the mold. Since thermoplastics do not cure or set, they can be remelted and then rehardened by cooling. Thermal aging, brought about by repeated exposure to the high temperatures required for melting, causes eventual degradation of the material and so limits the number of reheat cycles.

All polymers are formed by the creation of chemical linkages between relatively small molecules, or monomers, to form very large molecules, or polymers. As mentioned, if the chemical linkages form a rigid, cross-linked molecular structure, a thermosetting plastic results. If a somewhat flexible molecular structure with minimal or no cross-linking is formed, either linear or branched, a thermoplastic results.

Polymerization Reactions

Polymerization reactions may occur in a number of ways, with four common techniques being bulk, solution, suspension, and emulsion polymerization. Bulk polymerization involves the reaction of monomers or reactants among themselves, without placing them in some form of extraneous media, as is done in the other types of polymerization.

Solution polymerization is similar to bulk polymerization, except that whereas the solvent for the forming polymer in bulk polymerization is the monomer, the solvent in solution polymerization is usually a chemically inert medium. The solvents used may be complete, partial, or nonsolvents for the growing polymer chains.

Suspension polymerization normally is used only for catalyst-initiated or free radical addition polymerizations. The monomer is dispersed mechanically in a liquid, usually water, which is a nonsolvent for the monomer as well as for all sizes of polymer molecules which form during the reaction. The catalyst initiator is dissolved in the monomer, and it is preferable that it does not dissolve in the water so that it remains with the monomer. The monomer and the polymer being formed from it stay within the beads of organic material dispersed in the phase. Actually, suspension polymerization is essentially a finely divided form of bulk polymerization. The main advantage of suspension polymerization over bulk is that it allows cooling of the exothermic polymerization reaction and maintains closer control over the chain-building process. By controlling the degree of agitation, monomer-to-water ratios, and other variables it is also possible to control the particle size of the finished polymer, thus eliminating the need to reform the material into pellets from a melt, as is usually necessary with bulk polymerization.

Emulsion polymerization is a technique in which addition polymerizations are carried out in a water medium containing an emulsifier (a soap) and a water-soluble initiator. Emulsion polymerization is much more rapid than bulk or solution polymerization at the same temperatures and produces polymers with molecular weights much greater than those obtained at the same rate in bulk polymerizations.

In emulsion polymerization, the monomer diffuses into micelles, which are small spheres of soap film. Polymerization occurs within the micelles. Soap concentration, overall reaction-mass recipe, and reaction conditions can be varied to provide control of the reaction rate and yield.

The usual sequence of processing a thermoplastic is to heat the material so that it softens and flows, force the material in the desired shape through a die or in a mold, and chill the melt into its final shape. By comparison, a thermoset is typically processed by starting out with partially polymerized material, which is softened and activated by heating (either in or out of the mold), forcing it into the desired shape by pressure, and holding it at the curing temperature until final polymerization reaches the point where the part hardens and stiffens sufficiently to keep its shape when demolded.

Plastic-Fabrication Processes and Forms

There are many plastic-fabrication processes, and a wide variety of plastics can be processed by each of these processes or techniques. Fabrication processes can be broadly divided into pressure processes and pressureless or low-pressure processes. Pressureless or low-pressure processes include potting, casting, impregnating, encapsulating, and coating. Pressure processes are usually either thermoplastic-materials processes (such as injection molding, extrusion, and thermoforming) or thermosetting processes (such as compression molding, transfer molding, and laminating).

Compression Molding and Transfer Molding

Compression molding and transfer molding are the two major processes used for forming molded parts from thermosetting raw materials. The two can be carried out in the same type of molding press, but different types of molds are used. The thermosetting materials are normally molded by the compression or transfer process, but it is also possible to mold thermoplastics by these processes since the heated thermoplastics will flow to conform to the mold-cavity shape under suitable pressure. These processes are usually impractical for thermoplastic molding, however, since after the mold cavity is filled to its final shape, the heated mold would have to be cooled to solidify the thermoplastic part. Since repeated heating and cooling of this large mass of metal and the resultant long cycle time per part produced are both objectionable, injection molding is commonly used to process thermoplastics.

Compression Molding

In compression molding, the open mold is placed between the heated platens of the molding press, filled with a given quantity of molding material, and closed under pressure, causing the material to flow into the shape of the mold cavity. The actual pressure required depends on the molding material being used and the geometry of the mold. The mold is kept closed until the plastic material is suitably cured. Then the mold is opened, the part ejected, and the cycle repeated. The mold is usually made of steel with a polished or plated cavity.

The simplest form of compression molding involves the use of a separate self-contained mold or die that is designed for manual handling by the operator. It is loaded on the bench, capped, placed in the press, closed, cured, and then removed for opening under an arbor press. The same mold in most instances (and with some structural modifications) can be mounted permanently into the press and opened and closed as the press itself opens and closes. The press must have a positive up-and down movement under pressure instead of the usual gravity drop found in the standard hand press.

Transfer Molding

The molding material is first placed in a heated pot, separate from the mold cavity. The hot plastic material is then transferred under pressure from the pot through the runners into the closed cavity of the mold.

The advantage of transfer molding lies in the fact that the mold proper is closed at the time the material enters. Parting lines that might give trouble in finishing are held to a minimum. Inserts are positioned and delicate steel parts of the mold are not subject to movement. Vertical dimensions are more stable than in straight compression. Also, delicate inserts can often be molded by transfer molding, especially with the low-pressure molding compounds.

Injection Molding

Injection molding is the most practical process for molding thermoplastic materials. The operating principle is simple, but the equipment is not.

A material with thermoplastic qualities—one that is viscous at some elevated temperature and stable at room temperature without appreciable deterioration during the cycle—is maintained in a heated reservoir. This hot, soft material is forced from the reservoir into a cool mold. The mold is opened as soon as the material has cooled enough to hold its shape on demolding. The cycle speed is determined by the rapidity with which the temperature of the material used can be reduced, which in turn depends on the thermal conductivity of that material. Acrylics are slow performers, and styrenes are among the fastest.

The machine itself is usually a horizontal cylinder whose bore determines the capacity. Within the bore is a piston which, when retracted, opens a hole in the top of the cylinder through which new material can be added to replace the charge shot into the mold. The cylinder is heated by electric bands which permit temperature variation along its length. Inside the exit end of the cylinder is a torpedo over which the hot material is forced just before coming out of the nozzle into the channels leading to the cavities. This gives the material a final churning and ensures thorough heating. The mold opens and closes automatically, and the whole cycle is controlled by timers.

Thermoset Ingestion Molding

Because of the chemical nature of the plastic materials, injection molding has traditionally been the primary molding method for thermoplastics, and compression and transfer molding have been the primary molding methods for thermosetting plastics. Because of the greater molding cycle speeds and lower molding costs in injection molding, thermoplastics have had a substantial molding cost advantage over thermosets. As a result, advances in equipment and in thermosetting molding compounds have resulted in a rapid transition to screw-injection, in-line molding. This has been especially prominent with phenolics, but other thermosets are also included to varying degrees. The growth in screw-injection molding of phenolics has been extremely rapid. The development of this technique allows the molder to automate further, reduce labor costs, improve quality, reduce rejects, and gain substantially overall molding cycle efficiency.

Extrusion and Protrusion

The process of extrusion consists basically of forcing heated, melted plastic continuously through a die, which has an opening shaped to produce a desired finished cross section. Normally it is used for processing thermoplastic materials, but it can also be used for processing thermosetting materials. The main application of extrusion is the production of continuous lengths of film, sheeting, pipe, filaments, wire jacketing, and other useful forms and cross sections. After the plastic melt has been extruded through the die, the extruded material is hardened by cooling, usually by air or water.

Extruded thermosetting materials are used increasingly in wire and cable coverings. The main object here is the production of shapes, parts, and tolerances not obtainable in compression or transfer molding. Pultrusion is a special, increasingly used technique for pulling resin soaked fibers through an orifice, as it offers significant strength improvements. Any thermoset, granular molding compound can be extruded and almost any type of filler may be added to the compound. In fiber-filled compounds, the length of fiber is limited only by the cross-sectional thickness of the extruded piece.

A metered volume of molding compound is fed into the die feed zone, where it is slightly warmed. As the ram forces the compound through the die, the compound is heated gradually until it becomes semi-fluid. Before leaving the die, the extruded part is cured by controlling the time it takes to travel through a zone of increasing temperature. The cured material exits from the die at temperatures of 300° to 350° F. and at variable rates.

Thermosetting Plastics

Plastic materials included in the thermosetting plastic category are alkyds, diallyl phthalates, epoxies, melamines, phenolics, polyesters, silicones, and ureas. In general, unfilled thermosetting plastics tend to be harder, more brittle, and not as tough as thermoplastics. Thus, it is common practice to add fillers to thermosetting materials. A wide variety of fillers can be used for varying product properties. For molded products, usually compression or transfer molding, mineral or cellulose fillers are often used as lower-cost, general-purpose fillers, and glass fiber fillers are often used for optimum strength or dimensional stability. It should be added that filler form and filler surface treatment can also be major variables. Thus it is important to consider fillers along with the thermosetting material, especially for molded products. Other product forms may be filled or unfilled, depending on requirements.

Alkyds

Alkyds are available in granular, rope, and putty form, some suitable for molding at relatively low pressures, and at temperatures in the range of 300° to 400° F. They are formulated from polyester-type resins. Other possible monomers, aside from styrene, are diallyl phthalate and methyl methacrylate. Alkyd compounds are chemically similar to the polyester compounds but make use of higher-viscosity, or dry, monomers. Alkyd compounds often contain glass-fiber filler but may, for example, include clay, calcium carbonate, or alumina.

These unsaturated resins are produced through the reaction of an organic alcohol with an organic acid. The selection of suitable polyfunctional alcohols and acids permits selection of a large variation of repeating units. Formulating can provide resins that demonstrate a wide range of characteristics involving flexibility, heat resistance, chemical resistance, and electrical properties.

Diallyl Phthalates (Allyls)

Diallyl phthalates, or allyls, are among the best of the thermosetting plastics with respect to high insulation resistance and low electrical losses, which are maintained up to 400° F. or higher, and in the presence of high humidity environments. Also, diallyl phthalate resins are easily molded and fabricated.

There are several chemical variations of diallyl phthalate resins, but the two most commonly used are diallyl phthalate (DAP) and diallyl isophthalate (DAIP). The primary application difference is that DAIP will withstand somewhat higher temperatures than will DAP.

DAPs are extremely stable, having very low after-shrinkage, on the order of 0.1 percent. The ultimate in electrical properties is obtained by the use of the synthetic-fiber fillers. However, these materials are expensive, have high mold shrinkage, and have a strong, flexible flash that is extremely difficult to remove from the parts.

Epoxies

Epoxy resins are characterized by the epoxide group (oxirane rings). The most widely used resins are diglycidyl ethers of bisphenol A. These are made by reacting epichlorohydrin with bisphenol A in the presence of an alkaline catalyst. By controlling operating conditions and varying the ratio of epichlorohydrin to bisphenol A, products of different molecular weights can be made.

Another class of epoxy resins is the novolacs, particularly the epoxy cresols and the epoxy phenol novolacs. These are produced by reacting a novolac resin, usually formed by the reaction of o-cresol or phenol and formaldehyde with epichlorohydrin. These highly functional materials are particularly recommended for transfer-molding powders, electrical laminates, and parts where superior thermal properties, high resistance to solvents and chemicals, and high reactivity with hardeners are needed.

Another group of epoxy resins, the cycloaliphatics, is particularly important when superior arc-track and weathering resistance are necessary requirements. A distinguishing feature of cycloaliphatic resins is the location of the epoxy group(s) on a ring structure rather than on, the aliphatic chain. Cycloaliphatics can be produced by the peracetic epoxidation of cyclic olefins and by the condensation of an acid such as tetrahydrophthalic anhydride with epichlorohydrin, followed by dehydrohalogenation.

Epoxy resins must be cured with cross-linking agents (hardeners) or catalysts to develop desirable properties. The epoxy and hydroxyl groups are the reaction sites through which cross-linking occurs. Useful agents include amines, anhydrides, aldehyde condensation products, and Lewis acid catalysts. Careful selection of the proper curing agent is required to achieve a balance of application properties and initial handling characteristics.

Aliphatic amine curing agents produce a resin-curing agent mixture which has a relatively short working life, but which cures at room temperature or at low baking temperatures in relatively short time. Resins cured with aliphatic amines usually develop the highest exothermic temperatures during the curing reaction; thus the amount of material which can be cured at one time is limited because of possible cracking, crazing, or even charring of the resin system if too large a mass is mixed and cured. Also, physical and electrical properties of epoxy resins cured with aliphatic amines tend to degrade as the operating temperature increases. Epoxies cured with aliphatic amines find their greatest usefulness where small masses can be used, where room-temperature curing is desirable, and where the operating temperature required is below 100° C.

Epoxies cured with aromatic amines have a considerably longer working life than do those cured with aliphatic amines, but they require curing at 100° C. or higher. Resins cured with aromatic amines can operate at a temperature considerably above the temperature necessary for those cured with aliphatic amines. However, aromatic amines are not so easy to work with as aliphatic amines, because of the solid nature of the curing agents and that some (such as metaphenylene diamine) sublime when heated, causing stains and residue deposition.

Catalytic curing agents also have longer working lives than the aliphatic amine materials, and like the aromatic amines, catalytic curing agents normally require curing of the epoxy system at 100° C. or above. Resins cured with these systems have good high-temperature properties as compared with epoxies cured with aliphatic amines. With some of the catalytic curing agents, the exothermic reaction becomes high as the mass of the resin mixture increases.

Acid anhydride curing agents are particularly important for epoxy resins, especially the liquid anhydrides. The high-temperature properties of resin systems cured with these materials are better than those of resin systems cured with aromatic amines. Some anhydride-cured epoxy-resin systems retain most electrical properties to 150° C. and higher, and are not affected physically, even after prolonged heat aging at 200° C. In addition, the liquid anhydrides are extremely easy to work with in that they blend easily with the resins and reduce the viscosity of the resin system. Also, the working life of the liquid acid anhydride systems is comparable with that of mixtures of aliphatic amine and resin, and odors are slight. Amine promoters such as benzyl dimethylamine (BDMA) or DMP-30 are used to promote the curing of mixtures of acid anhydride and epoxy resin.

Epoxies are among the most versatile and most widely used plastics in the electronics field. This is primarily because of the wide variety of formulations possible, and the ease with which these formulations can be made and utilized with minimal equipment requirements. Formulations range from flexible to rigid in the cured state, and from thin liquids to thick pastes and molding powders in the uncured state. Conversion from uncured to cured state is made by use of hardeners or heat, or both. The largest application of epoxies is in embedding applications (potting, casting, encapsulating, and impregnating) in molded parts, and in laminated constructions such as metal-clad laminates for printed circuits and unclad laminates for various types of insulating and terminal boards. Molded parts have excellent dimensional stability.

Melamines and Ureas (Aminos)

As compared with alkyds, diallyl phthalates, and epoxies, which are polymers created by addition reactions and hence have no reaction byproducts, melamines and ureas (also commonly referred to as aminos) are polymers which are formed by condensation reactions and do give off by-products. Another example of this type of reaction is the polymerization reaction, which produces phenolics. Melamines and ureas are a reaction product of formaldehyde with amino compounds containing $NH_2$ groups. Hence they are often also referred to a melamine formaldehydes and urea formaldehydes.

Amino resins have found applications in the fields of industrial and decorative laminating, adhesives, protective coatings, textile treatment, paper manufacture, and molding compounds. Their clarity permits products to be fabricated in virtually any color. Finished products having an amino-resin surface exhibit excellent resistance to moisture, greases, oils, and solvents; are tasteless and odorless; are self-extinguishing; offer excellent electrical properties; and resist scratching and marring. The melamine resins offer better chemical, heat, and moisture resistance than do the ureas.

Amino molding compounds can be fabricated by economical molding methods. They are hard, rigid, and abrasion-resistant, and they have high resistance to deformation under load. These materials can be exposed to subzero temperatures without embrittlement. Under tropical conditions, the melamines do not support fungus growth.

Amino materials are self-extinguishing and have excellent electrical insulation characteristics. They are unaffected by common organic solvents, greases and oils, and weak acids and alkalies. Melamines are superior to ureas in resistance to acids, alkalies, heat, and boiling water, and are preferred for applications involving cycling between wet and dry conditions or rough handling. Aminos do not impart taste or odor to foods.

Addition of alpha cellulose filler, the most commonly used filler for aminos, produces an unlimited range of light-stable colors and high degrees of translucency. Colors are obtained without sacrifice of basic material properties. Shrinkage characteristics with cellulose filler are a major problem.

Melamines and ureas provide excellent heat insulation; temperatures up to the destruction point will not cause parts to lose their shape. Amino resins exhibit relatively high mold shrinkage, and also shrink on aging. Cracks develop in urea moldings subjected to severe cycling between dry and wet conditions. Prolonged exposure to high temperature affects the color of both urea and melamine products.

A loss of certain strength characteristics also occurs when amino moldings are subjected to prolonged elevated temperatures. Some electrical characteristics are also adversely affected; the arc resistance of some industrial types, however, remains unaffected after exposure at 500° F.

Ureas are unsuitable for outdoor exposure. Melamines experience little degradation in electrical or physical properties after outdoor exposure, but color changes may occur.

Phenolics

Like melamines and ureas, phenolic resin precursors are formed by a condensation reaction. Phenolics are among the oldest, best-known general-purpose molding materials. They are also among the lowest in cost and the easiest to mold. An extremely large number of phenolic materials are available, based on the many resin and filler combinations, and they can be classified in many ways. One common way of classifying them is by type of application or grade. In addition to molding materials, phenolics are used to bond friction materials for automotive brake linings, clutch parts, and transmission bands. They serve as binders for wood-particle board used in building panels and core material for furniture, as the water-resistant adhesive for exterior-grade plywood, and as the bonding agent for converting both organic and inorganic fibers into acoustical- and thermal insulation pads, batts, or cushioning for home, industrial, and automotive applications. They are used to impregnate paper for electrical or decorative laminates and as special additives to tackify, plasticize, reinforce, or harden a variety of elastomers.

Although it is possible to obtain various molding grades of phenolics for various applications, as discussed, phenolics, generally speaking, are not equivalent to diallyl phthalates and epoxies in resistance to humidity and retention of electrical properties in extreme environments. Phenolics are, however, quite adequate for a large percentage of electrical applications. Grades have been developed which yield considerable improvements in humid environments and at higher temperatures. The glass-filled, heat-resistant grades are outstanding in thermal stability up to 400° F. and higher, with some being useful up to 500° F. Shrinkage in heat aging varies over a fairly wide range, depending on the filler used.

Polybutadienes

Polybutadiene polymers that vary in 1,2 microstructure from 60 to 90 percent offer potential as moldings, laminating resins, coatings, and cast liquid and formed-sheet products. These materials, being essentially pure hydrocarbon, have outstanding electrical and thermal stability properties.

Polybutadienes are cured by peroxide catalysts, which produce carbon-to carbon bonds at the double bonds in the vinyl groups. The final product is 100 percent hydrocarbon except where the starting polymer is the —OH or —COOH terminated variety. The nature of the resultant product may be more readily understood if the structure is regarded as polyethylene with a cross-link at every other carbon in the main chain.

Use of the high-temperature peroxides maximizes the opportunity for thermoplastic-like processing, because even the higher-molecular-weight forms become quite fluid at temperatures well below the cure temperature. Compounds can be injection-molded in an in-line machine with a thermoplastic screw.

Polyesters (Thermosetting)

Unsaturated, thermosetting polyesters are produced by addition polymerization reactions. Polyester resins can be formulated to have a range of physical properties from brittle and hard to tough and resistant to soft and flexible. Viscosities at room temperature may range from 50 to more than 25,000 centipoise (cp). Polyesters can be used to fabricate a myriad of products by many techniques—open-mold casting, hand lay-up, spray-up, vacuum-bag molding, matched-metal-die molding, filament winding, pultrusion, encapsulation, centrifugal casting, and injection molding.

By the appropriate choice of ingredients, particularly to form the linear polyester resin, special properties can be imparted. Fire retardance can be achieved through the use of one or more of the following: chlorendic anhydride, aluminum trihydrite, tetrabromophthalic anhydride, tetrachlorophthalic anhydride, dibromoneopentyl glycol, and chlorostyrene. Chemical resistance is obtained by using neopentyl glycol, isophthalic acid, hydrogenated bisphenol A, and trimethyl pentanediol. Weathering resistance can be enhanced by the use of neopentyl glycol and methyl methacrylate. Appropriate thermoplastic polymers can be added to reduce or eliminate shrinkage during curing and thereby minimize one of the disadvantages historically inherent in polyester systems.

Thermosetting polyesters are widely used for moldings, laminated or reinforced structures, surface gel coatings, liquid castings, furniture products, fiberglass parts, and structures such as boats, including but not limited to sailboats, motor boats, and fishing boats; other motor vehicles such as automobiles, trains, motorcycles, trucks, and airplanes; gliders, sleds, and bathroom and kitchen components. Cast products include furniture, bowling balls, simulated marble, gaskets for vitrified-clay sewer pipe, pistol grips, pearlescent shirt buttons, and implosion barriers for television tubes.

By lay-up and spray-up techniques large- and short-run items are fabricated. Examples include boats of all kinds—pleasure sailboats and powered yachts, commercial fishing boats and shrimp trawlers, small military vessels—dune buggies, all-terrain vehicles, custom auto bodies, truck cabs, horse trailers, motor homes, housing modules, concrete forms, and playground equipment.

Molding is also performed with premix compounds, which are dough-like materials generally prepared by the molder shortly before they are to be molded by combining the premix constituents in a sigma-blade mixer or similar equipment. Premix, using conventional polyester resins, is used to mold automotive-heater housings and air-conditioner components. Low-shrinkage resin systems permit the fabrication of exterior automotive components such as fender extensions, lamp housings, hood scoops, and trim rails.

Wet molding of glass mats or preforms is used to fabricate such items as snack-table tops, food trays, tote boxes, and stackable chairs. Corrugated and flat paneling for room dividers, roofing and siding, awnings, skylights, fences, and the like is a very important outlet for polyesters.

Pultrusion techniques are used to make fishing-rod stock and profiles from which slatted benches and ladders can be fabricated. Chemical storage tanks are made by filament winding.

Silicones

Silicones are a family of unique synthetic polymers, which are partly organic and partly inorganic. They have a quartzlike polymer structure, being made up of alternating silicon and oxygen atoms rather than the carbon-to-carbon backbone, which is a characteristic of the organic polymers. Silicones have outstanding thermal stability.

Typically, the silicon atoms will have one or more organic side groups attached to them, generally phenyl ($C_6H_5$—), methyl ($CH_3$—), or vinyl ($CH_2$=CH—) units. Other alkyd aryl, and reactive organic groups on the silicon atom are also possible. These groups impart characteristics such as solvent resistance, lubricity and compatibility, and reactivity with organic chemicals and polymers.

Silicone polymers may be filled or unfilled, depending on properties desired and application. They can be cured by several mechanisms, either at room temperature [by room-temperature vulcanization (RTV)] or at elevated temperatures. Their final form may be fluid, gel, elastomeric, or rigid.

Some of the properties which distinguish silicone polymers from their organic counterparts are (1) relatively uniform properties over a wide temperature range, (2) low surface tension, (3) high degree of slip or lubricity, (4) excellent release properties, (5) extreme water repellency, (6) excellent electrical properties over a wide range of temperatures and frequencies, (7) inertness and compatibility, both physiologically and in electronic applications, (8) chemical inertness, and (9) weather resistance.

Flexible two-part, solvent-free silicone resins are available in filled and unfilled forms. Their viscosities range from 3000 cP to viscous thixotropic fluids of greater than 50,000 cP. The polymer base for these resins is primarily dimethylpolysiloxane. Some vinyl and hydrogen groups attached to silicon are also present as part of the polymer.

These products are cured at room or slightly elevated temperatures. During cure there is little if any exotherm, and there are no by-products from the cure. The flexible resins have Shore A hardness values of 0 to 60 and Bashore resiliencies of 0 to 80. Flexibility can be retained from −55° C. or lower to 250° C. or higher.

Flexible resins find extensive use in electrical and electronic applications where stable dielectric properties and resistance to harsh environments are important. They are also used in many industries to make rubber molds and patterns.

Rigid silicone resins exist as solvent solutions or as solvent-free solids. The most significant uses of these resins are as paint intermediates to upgrade thermal and weathering characteristics of organic coatings, as electrical varnishes, glass tape, and circuit-board coatings.

Glass cloth, asbestos, and mica laminates are prepared with silicone resins for a variety of electrical applications. Laminated parts can be molded under high or low pressures, vacuum-bag-molded, or filament-wound.

Thermosetting molding compounds made with silicone resins as the binder are finding wide application in the electronic industry as encapsulants for semiconductor devices. Inertness toward devices, stable electrical and thermal properties, and self-extinguishing characteristics are important reasons for their use.

Similar molding compounds, containing refractory fillers, can be molded on conventional thermoset equipment. Molded parts are then fired to yield a ceramic article. High-impact, long-glass-fiber-filled molding compounds are also available for use in high-temperature structural applications.

In general, silicone resins and composites made with silicone resins exhibit outstanding long-term thermal stabilities at temperatures approaching 300° C., and excellent moisture resistance and electrical properties.

All of the conventional plastics shrink and/or crack to some degree when molded into large objects. To avoid these problems, elaborate curing schemes often have to be implemented which, in some cases, takes time and specialized equipment. What is needed is an additive or additives that will inhibit cracking and shrinkage and allow the rapid casting of large objects from a variety of prior art resins.

SUMMARY OF THE INVENTION

The present invention comprises novel resin polymer additives which can be used to cast large objects in a short time with substantially no shrinkage or cracking, and without the use of specialized equipment or special curing environments such as heating. The additives of the present invention can be used in a wide variety of conventional resins.

The present invention comprises additives that impart non-shrinking properties and non-cracking properties to a wide variety of conventional resins. The additives can be added to resins and by adjusting the concentration of certain components of the additives, the rate of curing can be controlled without accompanying side effects such as shrinkage or cracking.

One of the non-shrinking formulations is a mixture comprising an aldehyde, a glycol, a perchlorate and a metal chloride. In one preferred embodiment, this non-shrinking formulation is a mixture comprising formaldehyde, ethylene glycol, copper perchlorate and copper chloride.

A second, non-shrinking formulation is an admixture comprising a peroxide or an azo compound, a methacrylate or acrylate monomer, and N-methylpyrrolidinone. In one preferred embodiment, this second, non-shrinking formulation is an admixture comprising benzoyl peroxide, methyl methacrylate and N-methyl pyrrolidone.

The present invention further comprises a non-cracking formulation containing N-butyl mercaptan and a halogenated compound, such as tetraethylammonium bromide, or various chain extenders.

The various formulations can be used in combination or singly depending upon the resin and filler to which the formulations are to be added. Preferably, all three formulations are added to the resin before casting the large object.

The present invention also comprises a filler in the form of binders and polar polymer gels that are treated with a polar solvent.

The present invention also optionally comprises a method of pretreating glass fiber before it is incorporated into a polymer resin to add strength to the resin. The pretreated fiber glass comprises conventional fiberglass that has been treated with a surfactant such as dodecyl benzene sulfonic acid or any other ionic surfactant. The dodecyl benzene sulfonic acid is dissolved in water and then the volume is increased with ethylene glycol at a ratio of approximately 10% ethylene glycol to approximately 90% aqueous solution.

Accordingly, it is an object of the present invention to provide additives to conventional resins which impart the desirable characteristics of non-shrinkage and non-cracking when casting the resin, with the addition of treated fillers as described above.

It is another object of the present invention to provide novel additives and resin compositions that can rapidly be cast into objects including large objects without shrinking or cracking.

It is yet another object of the present invention to provide a novel method of pouring or casting large objects from polymer resins.

It is yet another object of the present invention to provide a novel method of manufacturing large objects from polymer resins that are fire-resistant.

Another object of the present invention is to provide methods and compositions that can be used in the construction industry.

It is another object of the present invention to provide a method and composition for casting cultured marble.

Another object of the present invention is to provide additives for use in casting cultured marble which impart the desirable characteristics of non-shrinkage and non-cracking when casting the marble, and significantly accelerate the process of casting the marble.

These and other objects, features and advantages of the present invention will become apparent after a review of the following detailed description of the disclosed embodiments.

DETAILED DESCRIPTION OF THE INVENTION

The present invention comprises a polymer resin that can be rapidly cast with substantially no shrinkage or cracking. The polymer resin of the present invention can be cast into a variety of objects, including large objects, without special curing conditions. The polymer resin is especially useful in casting large building elements such as blocks, shingles, bricks, pilings, beams, walls, and the like.

The methods and compositions of the present invention may be used to make objects used in the construction industry. For example, foundations, pilings, walls, floors, floor tiles, sinks, counter tops, table tops, toilets, urinals, showers, bathtubs, Jacuzzis, hot tubs, whirlpools, may all be made. Plumbing materials including, but not limited to, pipes, sewer pipes, couplings, joints, fixtures, knobs, showerheads, faucets, drains, water pipes, water mains, and fountains may all be manufactured with the present invention. Houses may be constructed rapidly and at reduced cost in geographic areas deficient in traditional building materials such as timber. Apartment units may be cast rapidly in modular form and assembled quickly into buildings.

Drainage systems, culverts, driveways, walkways and many other objects typically made from concrete may be made with the methods and compositions of the present invention. Components of bridges and other reinforced structures may be constructed from the present invention due to the strength of these novel materials. Railroad ties, telephone poles, docks, decks, breakwaters, jetties, and other objects made from timber, concrete and/or steel may be made more economically and rapidly with the methods and materials of the present invention.

The present inventions include novel compositions comprising conventional resins including, but not limited to, epoxies, polyesters, polyurethanes, flexible silicones, rigid silicones, polybutadienes, polysulfides, depolymerized rubber and allylic resins. Polyesters that can be used in the present invention include, but are not limited to, alpha methyl styrene, methyl methacrylate, vinyl toluene, diallyl phthalate, triallyl cyanurate, divinyl benzene, and chlorostyrene.

Initiators for curing the resins include, but are not limited to, peroxides such as benzoyl peroxide, methyl ethyl ketone peroxide, hydrogen peroxide, and dibenzyl peroxide. Other initiators that may be used in the present invention include azo compounds.

Catalysts, including but not limited to, cobalt II acetate, cobalt II naphthanate, methylene II acetate, chromium II acetate, copper II acetate, and N,N-dimethylaniline, can optionally be used in the present invention. Catalysts are dissolved in any suitable solvent before use such as styrene, water, or alcohol. The catalysts that can be used in the present invention are well known to those of ordinary skill in the art. (See Handbook of Plastics, Elastomers and Composites, Harper, C. A., editor, McGraw-Hill, 1992 which is incorporated by reference)

Fillers can be used with the present invention in the form of powders, fibers, or flakes. Fillers are used to modify viscosity, increase pot life, reduce exotherm, modify density, improve heat resistance, modify thermal conductivity (usually to increase), increase strength, improve machineability, increase hardness and wear resistance, modify electrical properties, increase chemical and solvent resistance, modify friction characteristics, improve thermal shock resistance, improve adhesion, and impart color.

Generally the fillers should be low in cost, reproducible in composition, particle size, and shape, easy to disperse in the compound, and low in density, and they should not increase the viscosity of the mixture excessively. The filler should stay in suspension or, at worst, be able to be resuspended with a minimum of stirring. Fillers that can be used in the present invention include, but are not limited to, silica, calcium carbonate, clays, aluminum hydroxide, titanium dioxide, calcium silicate, glass spheres, hollow spheres, fibers including glass, asbestos, DACRON, cotton, nylon, metal powders and particles, powders, sand, soil, fly ash and pigments.

The present invention also incorporates reactant fillers. This is a filler that uniformly is distributed in the resin. The reactant fillers must be pretreated with a hydroxyl group (e.g., an alcohol such as ethyl alcohol), or diluted polar solvents or polar polymers such as carboxymethylcellulose (CMC), or a functional carbonyl group (e.g., an organic acid such as acetic acid) additive with slightly acidic pH and the non-cracking additive (see Example III). It is important to note that the pretreatment of fillers with a hydroxyl group, with diluted polar polymers, or with a carboxyl group as described above is essential to the practice of the present invention. The fillers should further be treated with the dispersant formulation described in Example IV. In one embodiment, the dispersant formulation comprises an ionic surfactant, such as dodecylbenzene sulfonic acid, mixed with p-toluene sulfonic acid monohydrate in a 1 to 1 ratio. This mixture is then added to ethylene glycol at a ratio 2 parts ethylene glycol to 1 part of the p-toluene sulfonic acid mixture. The treated filler is then added to the resin in a conventional manner.

The present invention includes additives that can be added to conventional resins and fillers that impart desired effects of non-shrinkage and non-cracking of the cured objects.

One of the additives that is a non-shrinking formulation is a mixture comprising an aldehyde, a glycol, a perchlorate and a metal chloride. The aldehydes that may be used in this formulation include, but are not limited to, formaldehyde, paraformaldehyde, and glutaraldehyde. The glycols that may be used in this formulation include, but are not limited to, propylene glycol and ethylene glycol. The perchlorates that may be used in this formulation include, but are not limited to, copper perchlorate. The metal chlorides that may be used in this formulation include, but are not limited to, copper II chloride, mercuric chloride, magnesium chloride, manganese chloride, nickel chloride, ferric chloride, ferrous chloride, silver chloride, gold chloride, zinc chloride, cadmium chloride, and aluminum chloride. In one preferred embodiment, this non-shrinking formulation is a mixture comprising formaldehyde, ethylene glycol, copper perchlorate and copper chloride. In this embodiment, this first non-shrinking additive that inhibits shrinking of the resin during curing comprises formaldehyde (approximately 100 parts), ethylene glycol (approximately 100 parts), copper perchlorate (approximately 10 parts), and copper chloride (approximately 20 parts). Depending upon the resin that is being treated, the composition can vary.

Another additive is a second, non-shrinking formulation which is an admixture comprising peroxide or an azo compound, a methacrylate or acrylate monomer, and N-methylpyrrolidinone. The peroxides that may be used in this formulation include, but are not limited to, benzoyl peroxide, hydrogen peroxide, dibenzyl peroxide and methyl ethyl ketone peroxide. Azo compounds may be used instead of peroxide compounds. The methacrylates and acrylate monomers that may be used in this formulation include, but are not limited to, those listed in Table 1. In one preferred embodiment, this second, non-shrinking formulation that inhibits shrinking of the resin during curing comprises an admixture of benzoyl peroxide, methyl methacrylate and N-methylpyrrolidinone. In this embodiment, benzoyl peroxide, methyl methacrylate and N-methylpyrrolidinone (NMP) are present in a ratio of approximately 100:50:20.

TABLE I

| Monomer |
| --- |
| methyl methacrylate |
| ethyl methacrylate |
| n-propyl methacrylate |
| n-butyl methacrylate |
| n-hexyl methacrylate |
| isopropyl methacrylate |
| isobutyl methacrylate |
| tert-butyl methacrylate |
| cyclohexyl methacrylate |
| benzyl methacrylate |
| phenyl methacrylate |
| 1-phenylethyl methacrylate |
| 2-phenylethyl methacrylate |
| furfuryl methacrylate |
| methyl acrylate |
| ethyl acrylate |
| n-butyl acrylate |
| benzyl acrylate |
| 2-chloroethyl acrylate |
| methyl-$\alpha$-chloroacrylate |
| 2,2,2-trifluoroethyl acrylate |
| 2,2,2-trifluoroethyl methacrylate |

Finally, the present invention further comprises a third additive that is a non-cracking additive is a formulation containing N-butyl mercaptan and a halogenated compound, such as tetraethylammonium bromide, or various chain extenders. In one embodiment, N-butyl mercaptan and tetraethylammonium bromide are mixed together at a ratio of approximately 100 parts N-butyl mercaptan to 1 part tetraethylammonium bromide by weight. Other chain extenders may also be substituted in this formulation to impart non-cracking properties. This additive should be combined with the other additives disclosed above in the practice of the present invention.

The various formulations can be used in combination or singly depending upon the resin and filler to which the formulations are to be added. In general terms, the present invention provides a method of making object comprising treating fillers with polar solvents or polar polymers and dispersant formulation, mixing the treated fillers with resin, adding ethylene glycol and styrene, adding in any order the three additives A, B, and C, described in Examples I, II, and III, adding a catalyst and N,N-dimethylaniline, and adding an initiator.

Typically, these three additives are added at a concentration of between 0.1 to 4% by weight with a desired concentration of between approximately 0.5% to 2% by weight. It is to be understood that the additives can be used separately or together in the final resin preparation depending upon the desired properties that need to be imparted to the formed object.

The present invention also includes cultured marble products. According to the present invention, cultured marble products can be made without the prior art requirements of carefully controlling the curing process to avoid shrinkage and cracking of the final poured product. The cultured marble products made with the present invention may be used in a variety of applications described above. Some preferred applications of the present invention are the production of tiles, sinks, counter tops, table tops, toilets, urinals, showers, bathtubs, Jacuzzis, hot tubs, whirlpools, couplings, joints, fixtures, knobs, showerheads, faucets, drains, fountains, siding, and surface application to bricks or stone.

It is to be understood that the objects made through the practice of the present invention possess special properties such as fire retardance, chemical resistance, weather resistance, resistance to ultraviolet radiation, heat resistance, and electrical properties. These properties can be enhanced by altering the addition of specific chemicals disclosed herein.

This invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention.

EXAMPLE I

A first non-shrinking additive (A) is a formulation that can be used with conventional resins to inhibit shrinking of the resin as it cures is described in this example. The formulation comprises the following:

Additive A (Non-shrinking formulation)

Formaldehyde - - - 100 mL
Ethylene Glycol - - - 100 mL
Copper perchlorate - - - 10 mg
Copper chloride - - - 20 mg
The copper chloride and copper perchlorate are dissolved into formaldehyde and ethylene glycol.

EXAMPLE II

A second non-shrinking additive (B) is a formulation that can be used with conventional resins to inhibit shrinking of the resin as it cures is described in this example. The formulation comprises the following:

Additive B (Non-shrinking formulation)

Benzoyl peroxide - - - 118 mg
Methyl methacrylate - - - 50 mL
N-methylpyrrolidinone - - - 20 mL
The benzoyl peroxide is dissolved into the methyl methacrylate and N-methylpyrrolidinone.

EXAMPLE III

A third additive is a non-cracking formulation that can be used with conventional resins to inhibit shrinking of the resin as it cures is described in this example. The formulation comprises the following:

Additive C (Non-cracking formulation)

N butyl mercaptan - - - 100 mg
Tetraethylammonium bromide - - - 1 mg

EXAMPLE IV

To a polyester resin add equal amounts of any filler pretreated with a polar solvent or mixed in dilute polar polymer, such as slightly acidic water, alcohol, or 10% carboxy methylcellulose in slightly acidic water. Next add 0.2% of additive A, 1.8% of non-shrinking additive B, 1–2% of N,N-dimethylaniline, and 2% of the non-cracking additive C. Next, the initiator, such as a benzoyl peroxide, and a catalyst, such as cobalt II acetate, are added at concentrations of 2% each to polymerize the resin. The resin polymerizes with no detectable shrinkage or cracking. All percentages in this example are vol % unless otherwise indicated.

EXAMPLE V

A dispersant formulation for pretreating fillers is prepared as follows: 60 grams of dodecylbenzene sulfonic acid (sodium salt) is dissolved completely in 60 ml of aqueous 0.1M p-toluene sulfonic acid monohydrate. Then, add 2580 ml of ethylene glycol and 1200 ml of 0.1M toluene sulfonic acid solution. The resulting solution is then thoroughly mixed. Fillers can either be added directly to the formulation or they can be pretreated with an organic alcohol, such as ethyl alcohol or an organic carboxylic acid, such as acetic acid (0.01–0.1M) at a slightly acid pH. The fillers to be added to the resin are immersed in the dispersant formulation for a period of 0.5 to 2 hours. The fillers are then added to the resin mixture.

EXAMPLE VI

This Example describes the production of cultured marble using the additives of the present invention and a filler that is not a polar polymer. The production of cultured marble is in two parts. The basic resin makes up the body of the cultured marble object. The gel coat provides a smooth surface for the cultured marble object. The surface is capable of being colored.

The basic resin in this Example is 300 ml of diethyl fumarate trans-2-butene 1,4 diol gel. It is to be understood that any resin or polyester resin may be used in the practice of the method disclosed in this Example. The filler is prepared as follows: 732.5 gm of $CaCO_3$ and 504 gm of $TiO_2$ are mixed and then treated with 10–20% by weight of ethyl alcohol or slightly acidic water for 1 hour. Filters other than $CaCO_3$ and $TiO_2$ including but not limited to powders, sand, soil, fly ash may be used in this invention. The dispersant formulation from Example V is then added to the filler preparation at a concentration of 1.5% by weight. The resin (diethyl fumarate trans-2-butene 1,4 diol gel) is then mixed with the filler in dispersant formulation. Additive A from Example I, additive B from Example II and the non-shrinking additive C from Example III are then added in any order to a final concentration of 1% by weight of each. To this mixture is added 70 ml of glycol, 70 ml of styrene, 12 ml of cobalt II acetate and 14 ml of N,N-dimethylaniline. This formulation is thoroughly mixed. To polymerize the basic resin, 10 ml of a 30% solution of benzoyl peroxide is added. This formulation is designated the "basic resin".

The gel coat resin is prepared as follows: A first formulation is prepared by mixing 1008 gm of $TiO_2$ with 60 ml of 4% diluted dodecyl benzene in water. 60 ml of the basic resin without the benzoyl peroxide is added along with 6.5 ml of cobalt II acetate. The first formulation is then thoroughly mixed.

A second gel coat preparation comprises 300 ml of gel coat resin (gel coat resin from Occidental Chemicals) mixed with 105 gm of $TiO_2$. The first preparation and the second gel coat preparation are mixed in a ratio of 2 to 1. Just before use, an initiator such as 10% to 30% methyl ethyl ketone peroxide or 10% to 30% benzoyl peroxide is added at a final concentration of 2% by volume.

The gel coat preparation is coated on the surface of a form. The basic resin formulation is then poured into the form and allowed to cure. The resin cures to hardness within 5 minutes and is completely cured within 1 hour. The object can be removed from the mold after approximately 10 minutes.

EXAMPLE VII

This example describes a method for rapid casting that may be employed with both the gel coat preparations, including cultured marble, and conventional resin formulations. The method involves two steps which may be practiced at room temperature and involves the use of a polar polymer as the filler. The method produces a smooth surface. In addition, the resins from Example VI may be used in the practice of the method disclosed in this Example.

Step 1: First the carboxymethylcellulose (CMC) gel is formed by saturating 200 ml of CMC powder with methanol. Next 800 ml of water is slowly added while mixing.

Step 2: To each 40 ml of any gel coat or resin formulation, add between 3 ml and 200 ml of the CMC gel. Optionally, 10% to 20% of glycol or styrene could be added to this mixture. The amount of CMC gel is based on the desired strength, appearance, and cost of the final product. Next, 1–2% (vol %) of N,N-dimethylaniline (100% distilled) is added together with any known catalyst while mixing. Catalysts which may be employed at this step include, but are not limited to methylene II acetate, chromium II acetate, copper II acetate and cobalt II naphthanate. Catalysts are added at 10% (vol %) in solvents such as alcohol, styrene, water, or any suitable solvent for the specific catalyst.

The reaction is initiated by adding 1–2% (vol %) of peroxides and mixing into the other ingredients. The peroxides which may be used include, but are not limited to methyl ethyl ketone peroxide, hydrogen peroxide, and dibenzyl peroxide at concentrations of 10% to 30%. Other initiators that may be used include other peroxide initiators and azo initiators. The curing rate and heat generated vary depending on the amount of CMC gel and peroxides employed. Addition of more gel produces less heat and increases curing time while addition of more gel results in generation of higher amounts of heat and reduces curing times.

The method of this example produces a clear gel coat in contrast to many methods taught in the art. In addition, this method is amenable to pouring the gel coat into a mold, and painting or spraying the gel coat onto a surface.

It should be understood, of course, that the foregoing relates only to preferred embodiments of the present invention and that numerous modifications or alterations may be made therein without departing from the spirit and the scope of the invention.

I claim:

1. A method for producing an object, comprising:
   mixing a resin with a first additive to form a mixture; wherein the first additive accelerates curing and inhibits shrinking of the mixture, said first additive comprising an aldehyde, a glycol, a perchlorate and a metal chloride;
   adding a catalyst; and
   adding an initiator.

2. The method of claim 1, wherein the resin is poly ster, phenolic, epoxy, silicone, polyurethane, flexible silicone, rigid silicone, polybutadiene, polysulfide, depolymerized rubber, allylic, alkyd, diallyl phthalate, melamine, amino or urea.

3. The method of claim 1, further comprising adding a second additive that accelerates curing and inhibits shrinking of the mixture, said second additive comprising a peroxide or an azo compound, a methacrylate or acrylate monomer, and N-methyl pyrrolidinone.

4. The method of claim 1 wherein the treated filler is mixed in polar solvents or polar pymers.

5. The method of claim 4, wherein the filler is mixed in 10% to 20% polar solvents or polar polymers.

6. An object produced by the method of claim 1.

7. The method of claim 3, further comprising adding a third additive that acceleates curing and inhibits cracking of the mixture, said third additive comprising N-butyl mercaptan and tetraethylammonium bromide.

8. The method of claim 1, further comprising adding a treated filler to the mixture.

9. A method for producing an object, comprising:
   mixing a resin with a first additive to form a mixture, wherein the first additive accelerates curing and inhibits shrinking of the mixtures, said first additive comprising a peroxide or an azo compound, a methacrylate or acrylate monomer, and N-methyl pyrrolidinone;
   adding a catalyst; and
   adding an initiator.

10. The method of claim 9, wherein the resin is polyester, phenolic, epoxy, silicone, polyurethane, flexible silicone, rigid silicone, polybutadiene, polysulfide, depolymerized rubber, allylic, alkyd, diallyl phthalate, melamine, amino or urea.

11. The method of claim 9, further comprising adding a second additive that accelerates curing and inhibits cracking of the mixture, said second additive comprising N-butyl mercaptan and tetraethylammonium bromide.

12. The method of claim 9, further comprising adding a treated filler to the mixture.

13. A method for producing an object, comprising:
   mixing a resin with a first additive to form a mixture, wherein the first additive accelerates curing and inhibits cracking of the mixture, said first additive comprising N-butyl mercaptan and a halogenated derivative;
   adding a catalyst; and
   adding an initiator.

14. The method of claim 13, wherein the halogenated derivative comprises tetraethylammonium bromide.

15. The method of claim 13, wherein the resin is polyester, phenolic, epoxy, silicone, polyurethane, flexible silicone, rigid silicone, polybutadiene, polysulfide, depolymerized rubber, allylic, alkyd, diallyl phthalate, melamine, amino or urea.

16. The method of claim 13, further comprising adding a second additive that accelerates curing and inhibits shrinking of the mixture, said second additive comprising an aldehyde, a glycol, a perchlorate and a metal chloride.

17. The method of claim 13, further comprising adding a treated filler to the mixture.

18. A method for producing an object, comprising:

mixing a resin with a first additive, a second additive and a third additive to form a mixture, wherein the first additive accelerates curing and inhibits shrinking of the mixture, said first additive comprising an aldehyde, a glycol, a perchlorate and a metal chloride; wherein the second additive accelerates curing and inhibits shrinking, said second additive comprising a peroxide or an azo compound, a methacrylate or acrylate monomer, and N-methyl pyrrolidinone; and wherein the third additive accelerates curing and inhibits cracking of the mixture, said third additive comprising N-butyl mercaptan and tetraethylammonium bromide;

adding a catalyst; and adding an initiator.

19. The method of claim 18, further comprising adding a filler to the mixture.

20. The method of claim 18, further comprising adding a treated filler to the mixture.

* * * * *